C. H. Latham,
Castor.
No. 4,209. Reissued Dec. 20. 1870.
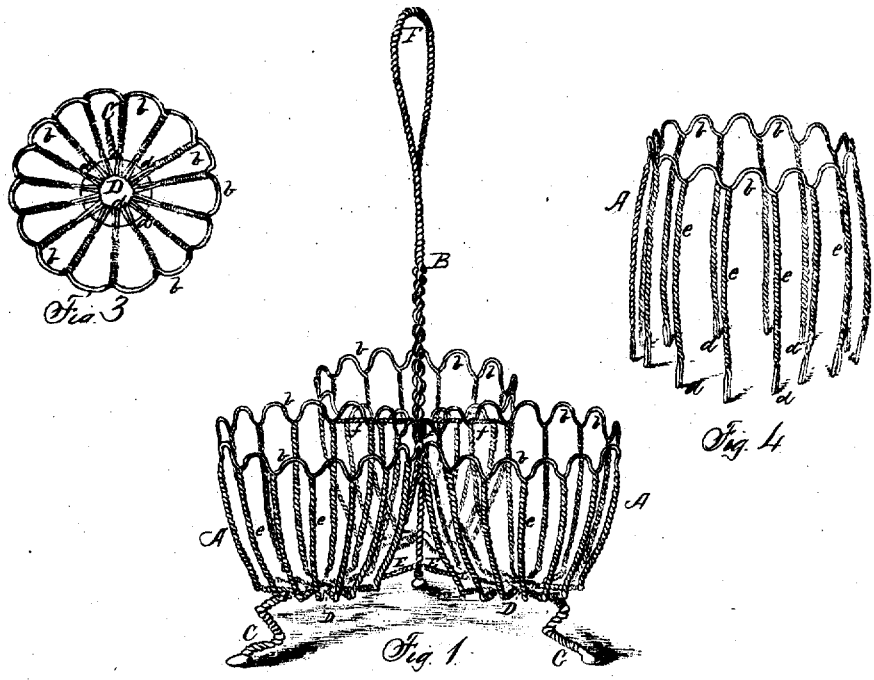
Edward E. Osborn
Robert H. Manners
C. H. Latham
By H. A. Dingee Atty
N. PETERS, PHOTO-LITHOGRAPHER, WASHINGTON, D. C.

United States Patent Office.

CYRUS H. LATHAM, OF LOWELL, MASSACHUSETTS, ASSIGNOR TO WOODS, SHERWOOD & CO., OF SAME PLACE.

Letters Patent No. 104,743, dated June 28, 1870; reissue No. 4,209, dated December 20, 1870.

DIVISION B.

IMPROVEMENT IN CUPS FOR CASTERS, &c.

The Schedule referred to in these Letters Patent and making part of the same.

Be it known that I, CYRUS H. LATHAM, of Lowell, in the county of Middlesex and State of Massachusetts, have invented certain new and useful Improvements in the construction of Cups, &c., out of wire twisted into proper blanks, of which the following is a specification.

*Nature and Objects of the Invention.*

My invention relates to the manufacture of articles for domestic use made from twisted wire, such as caster-cups, egg-stands, holders for glasses, &c.; and It consists of twisting wire into the form and in the manner hereinafter described, in order to produce the above-named articles in a more perfect manner at a low cost.

For the purpose of illustration, I describe in this specification a table-caster having a series of cups made in accordance with my invention and united together, as shown, to hold the bottles; but by making the cups A of different sizes and shapes they may be formed into various articles of manufacture, as above recited.

*Description of the Drawing.*

Figure 1 shows a table-caster complete, formed of cups made in accordance with my invention.

Figures 2 and 4 show a blank from which the cups, &c., are formed.

Figure 3 is a view of one of the cups.

*General Description.*

The blank, fig. 2, from which the cups, &c., are formed, is composed of a series of wires, *a a*, bent in a double state to form the bows *b*, and twisted together into several strands, *e e*.

When thus formed the two end wires *a a*, at the ends, are twisted together so as to bring the blank into a cylindrical shape.

When the blanks are thus constructed they may be made into various articles, one of which, a table-caster, is shown in fig. 1 of the drawing.

In constructing this caster, the ends *d d* of the twisted wire blank are passed through the ring D and bent up from the under side to embrace it; and two of the strands *c c* may be left longer than the others to form the leg C.

After the cups A are given the required shape by means of dies or otherwise, they are united together and to the handle B by means of the twisted-wire braces *f f* and E E, composed of strands of wire, which also go to form the handle.

*Claim.*

As a new article of manufacture, a cup, basket, or holder of twisted wire, constructed substantially in the manner and for the purposes set forth and specified.

CYRUS H. LATHAM.

Witnesses:
C. A. DURGIN,
EDWARD E. OSBORN.